(12) United States Patent
Zearing

(10) Patent No.: US 10,372,299 B2
(45) Date of Patent: Aug. 6, 2019

(54) PRESERVE INPUT FOCUS IN VIRTUALIZED DATASET

(71) Applicant: MICROSOFT TECHNOLOGY LICENSING, LLC, Redmond, WA (US)

(72) Inventor: David Zearing, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 15/275,212

(22) Filed: Sep. 23, 2016

(65) Prior Publication Data

US 2018/0088758 A1    Mar. 29, 2018

(51) Int. Cl.
*G06F 3/0483* (2013.01)
*G06T 3/40* (2006.01)
*G06F 3/0481* (2013.01)
*G06F 3/0485* (2013.01)
*G06F 16/957* (2019.01)

(52) U.S. Cl.
CPC .......... *G06F 3/0483* (2013.01); *G06F 3/0481* (2013.01); *G06F 3/0485* (2013.01); *G06F 3/04855* (2013.01); *G06F 16/957* (2019.01); *G06T 3/40* (2013.01)

(58) Field of Classification Search
CPC .... G06F 3/0483; G06F 3/0481; G06F 3/0485; G06F 3/04855; G06F 17/30899; G06T 4/40; G06T 3/40
See application file for complete search history.

(56) References Cited

U.S. PATENT DOCUMENTS

| | | | |
|---|---|---|---|
| 7,441,047 B2 | 10/2008 | Gibbs et al. | |
| 7,694,233 B1 | 4/2010 | Ording | |
| 7,761,812 B2 | 7/2010 | Ostojic et al. | |
| 8,429,521 B2 | 4/2013 | Lloyd et al. | |
| 8,434,018 B2 | 4/2013 | Tapuska | |
| 8,775,506 B2 | 7/2014 | Evans et al. | |
| 8,887,085 B1 | 11/2014 | Cox et al. | |
| 9,218,267 B1 | 12/2015 | Keller | |
| 9,336,753 B2 | 5/2016 | Leventhal et al. | |
| 9,612,734 B1 * | 4/2017 | Sylvia | G06F 3/04855 |
| 2005/0289450 A1 | 12/2005 | Bent et al. | |
| 2006/0085741 A1 | 4/2006 | Weiner et al. | |
| 2009/0106687 A1 | 4/2009 | De souza sana et al. | |
| 2009/0327952 A1 | 12/2009 | Karas et al. | |

(Continued)

OTHER PUBLICATIONS

"Optimizing Performance: Controls", Published on: Dec. 25, 2011, Available at: https://msdn.microsoft.com/en-us/library/cc716879(v=vs.110).aspx.

(Continued)

*Primary Examiner* — Tadesse Hailu
(74) *Attorney, Agent, or Firm* — Talem IP Law, LLP

(57) ABSTRACT

Variety of approaches to preserve an input focus in a virtualized dataset is described. An application initiates operations to preserve an input focus in a virtualized dataset by presenting an initial page of items from a large dataset in a visible area. A spacer associated with a non-rendered page of items from the large dataset is rendered in a virtual area of the application. Next, an initial focus position is assigned to the initial page of items. Furthermore, the initial page of items is stored in a focus page index in an association with the initial focus position.

16 Claims, 7 Drawing Sheets

(56) References Cited

U.S. PATENT DOCUMENTS

| | | |
|---|---|---|
| 2009/0327965 A1 | 12/2009 | Averett et al. |
| 2010/0153544 A1 | 6/2010 | Krassner et al. |
| 2010/0269152 A1 | 10/2010 | Pahlavan et al. |
| 2011/0258575 A1 | 10/2011 | Cupp et al. |
| 2012/0011430 A1 | 1/2012 | Parker et al. |
| 2012/0042279 A1* | 2/2012 | Naderi ................ G06F 3/04855 715/786 |
| 2012/0110499 A1 | 5/2012 | Hance et al. |
| 2012/0159393 A1 | 6/2012 | Sethi |
| 2013/0103738 A1 | 4/2013 | Evans et al. |
| 2013/0174016 A1 | 7/2013 | Glazer et al. |
| 2013/0187944 A1 | 7/2013 | Hamana et al. |
| 2014/0108981 A1* | 4/2014 | Payzer ................ G06F 3/0481 715/767 |
| 2014/0129966 A1 | 5/2014 | Kolesnikov et al. |
| 2014/0201154 A1* | 7/2014 | Varadharajan ...... G06F 11/1451 707/647 |
| 2014/0237370 A1 | 8/2014 | Canitz |
| 2015/0007108 A1 | 1/2015 | Ozcelik |
| 2015/0149889 A1 | 5/2015 | Yang |
| 2015/0199324 A1 | 7/2015 | Nishioka |
| 2015/0213117 A1 | 7/2015 | Bailie et al. |
| 2016/0070434 A1 | 3/2016 | Clark et al. |
| 2016/0070457 A1 | 3/2016 | Furtwangler et al. |
| 2016/0070682 A1 | 3/2016 | Furtwangler et al. |
| 2017/0357398 A1* | 12/2017 | Alonso-Ruiz ....... G06F 3/04817 |
| 2018/0059916 A1 | 3/2018 | Zearing |
| 2018/0101295 A1* | 4/2018 | Casey ................ G06F 3/04855 |

OTHER PUBLICATIONS

"Manage Caching of Large Dataset in Resource Limited Browser (Mobile)", Retrieved from https://stackoverflow.com/questions/31826859/manage-caching-of-large-dataset-in-resource-limited-browser-mobile, Oct. 16, 2015, 3 Pages.

"Non Final Office Action Issued in U.S. Appl. No. 15/245,213", dated Apr. 3, 2018, 37 Pages.

Maeda, et al., "Webdigest: Layout-Preserving Visually Enhanced Web Pages", In Proceedings of the Symposium on Applications and the Internet, Jan. 27, 2003, 4 Pages.

"International Search Report and Written Opinion Issued in PCT Application No. PCT/US2017/047462", dated Oct. 4, 2017, 13 Pages.

"International Search Report and Written Opinion Issued in PCT Application No. PCT/US2017/051679", dated Nov. 24, 2017, 13 Pages.

"Notice of Allowance Issued in U.S. Appl. No. 15/245,213", dated Aug. 6, 2018, 20 Pages.

* cited by examiner

PRESERVE INPUT FOCUS IN VIRTUALIZED DATASET

BACKGROUND

Information collection, management, and analysis have changed work processes and associated data management. Automation and improvements in work processes have expanded scope of capabilities offered by businesses. With the development of faster and smaller electronics, execution of mass processes at data analysis systems have become feasible. Indeed, analysis work at data centers, data warehouses, data workstations have become common business and private features in modern work and personal environments. Such systems provide a wide variety of applications such as web browsers that present data management tools. Many such applications present large datasets to attempt to improve consumption of big data. Big data gathering and presentation consumes significant resources and performance at a promise of improved processes and condensed task flows.

Data presentation techniques are becoming ever more important as big data grows in popularity across the computer industry. Varieties of techniques are necessary for presenting large data quantities found in big data, to facilitate mining of the relevant insights, and (ultimately) to deliver the benefit of relevant insights to stakeholders. There are currently significant gaps within data presentation methods employed when presenting large datasets and preserving focus in a presented portion of a large dataset. Lack of easy to use data presentation methods lead to underutilization of collected large datasets.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to preserving an input focus in a virtualized dataset. An application, according to embodiments, may initiate operations to preserve an input focus in a virtualized dataset by presenting an initial page of items from a large dataset in a visible area. A spacer associated with a non-rendered page of items (from the large dataset) may be rendered in a virtual area of the application while allocating layout space around the initial page of items that has the focused content. Next, an initial focus position may be assigned to the initial page of items. Furthermore, the initial page of items may be stored in a focus page index in an association with the initial focus position.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
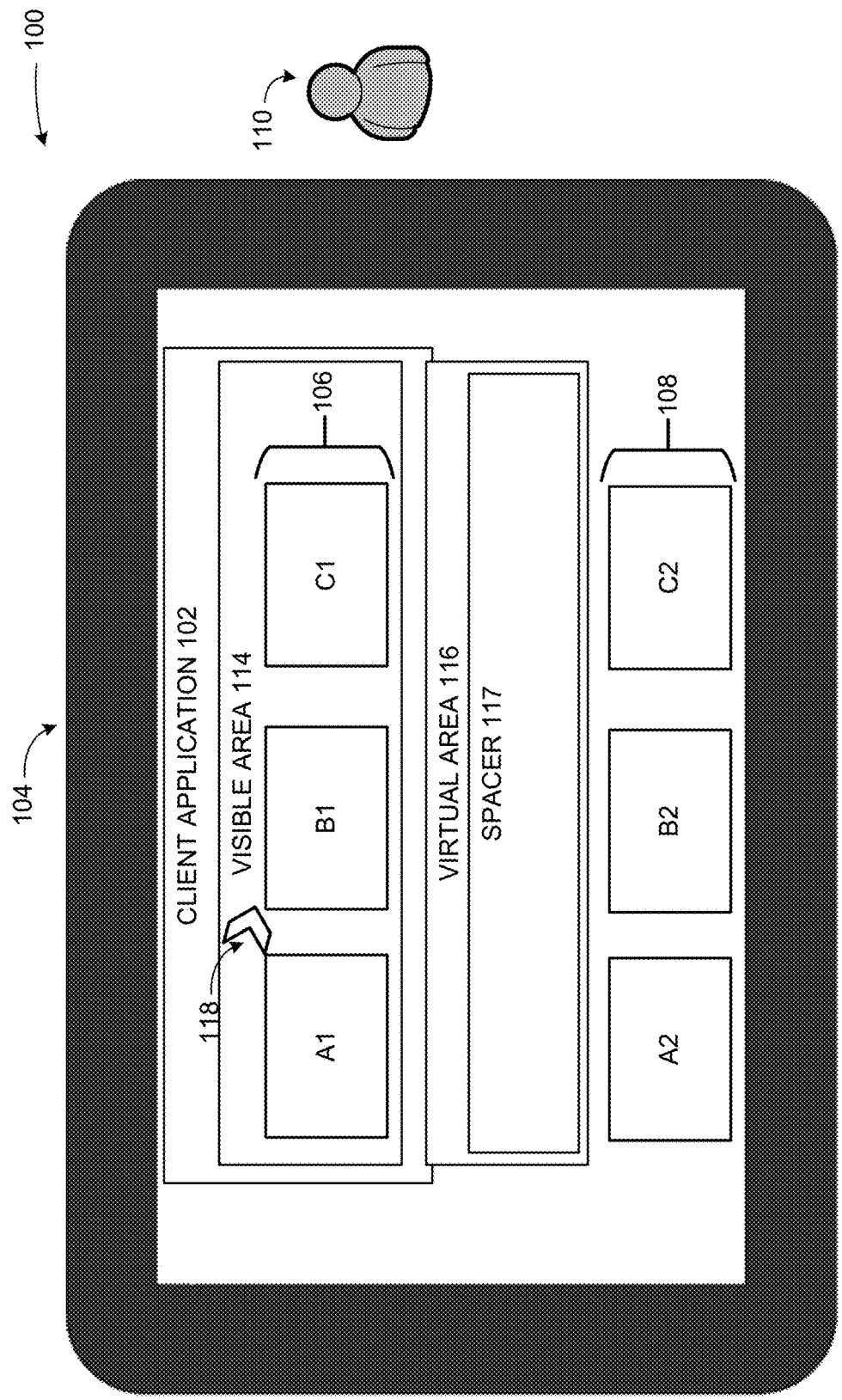
FIG. 1 is a conceptual diagram illustrating an example of preserving an input focus in a virtualized dataset, according to embodiments.

As briefly described above, a client application may preserve an input focus in a virtualized dataset. In an example scenario, the client application, which may include a web browser, may present an initial page of items from a large dataset in a visible area of the application. For example, items in the large dataset (such as images, objects, drawings, and/or text, among others) may be partitioned to pages of items. A page of items may include a number of the items that render in the visible area for optimum or desired readability. The number of the items in a page may change based on a size of the visible area and how many items the visible area may accommodate for optimum or desired readability. As such, partitioning of the large dataset may dynamically be updated as page(s) with items of varying sizes are rendered in the visible area. Alternatively, the client application may also render the initial page of items and other page(s) of items in the visible area based on available space in the visible area.

The client application may also render a spacer associated with a non-rendered page of items from the large dataset in a virtual area while allocating layout space around the initial page of items that has the focused content. The spacer may be a placeholder for a non-rendered page of the large dataset that provides fast access to the non-rendered page. Initially, the spacer may be configured to accommodate a size of the initial page of items. Other spacers may also be rendered in the virtual area to encompass the non-rendered pages of the large dataset (that are partitioned, for example, based on a number of items in the initial page of items). The size of the spacer may be dynamically updated to accommodate a size of a non-rendered page that is moved to the visible area for rendering. As a result, a number of spacers may increase or decrease to match the number of pages of the large dataset.

Next, the client application may assign an initial focus position to the initial page of items. The initial focus position may be used as a referral tool to preserve an input focus on the initial page of items. The initial page of items may be stored in a focus page index in an association with the initial focus position to preserve the input focus on the initial page of items.

In response to a scroll action, non-rendered page(s) of items from the large dataset that correlate to the scroll action may be rendered as newly rendered page(s) of items. The initial page of items may be removed and replaced with another spacer. However, since the input focus may be preserved on the initial page of items, the initial page of items may be re-rendered in the visible area in response to a directional input. The newly rendered page(s) of items may be replaced with a spacer (and rendered in the virtual area).

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to preserve an input focus in a virtualized dataset. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating examples of preserving an input focus in a virtualized dataset, according to embodiments.

In a diagram 100, a computing device 104 may execute a client application 102. The client application 102 may include a web browser. The computing device 104 may include a physical computer and/or a mobile computing device such as a smart phone and/or similar ones. The computing device 104 may also include a special purpose and/or configured device that is optimized to execute data operations associated with the client application 102. For example, the computing device 104 may include physical components that are custom built to accelerate operations associated with a large dataset such as multiple computation cores tailored to process number of data streams associated with the large dataset.

The computing device 104 may execute the client application 102. The client application 102 may initiate operations to preserve an input focus in a virtualized dataset by presenting an initial page of items 106 from a large dataset in a visible area 114 of the client application 102. For example, items in the large dataset (text, graphic, image, audio, and/or video, among others) may be partitioned to pages of items. A page of items may include a number of the items that render in the visible area for optimum or desired readability. Optimum or desired readability may be defined by the computing device 104 to provide a consumer 110 with a font size or a graphic size sufficient for the consumer 110 to recognize the associated item. Optimum or desired readability may also be configured by the consumer 110 to adjust up or down a font size and/or a graphic size of an item to render the item as recognizable. The number of the items in a page may change based on a size of the visible area and how many items the visible area may accommodate for optimum or desired readability. As such, partitioning of the large dataset may dynamically be updated as page(s) with items of varying sizes are rendered in the visible area 114. Alternatively, the client application may also render the initial page of items 106 and other page(s) of items in the visible area based on available space in the visible area.

The client application 102 may also render a spacer 117 associated with a non-rendered page of items 108 (from the large dataset) in a virtual area 116. The spacer 117 may be a placeholder for the non-rendered page of items 108. The spacer provides fast access to the non-rendered page of items 108. The spacer 107 may also consume minimized resources while the client application 102 renders the large dataset. Initially, the spacer 107 may be configured to accommodate a size of the initial page of items 106. Other spacers may also be rendered in the virtual area 116 to encompass the non-rendered pages of the large dataset that are partitioned based on a number of items in the initial page of items 106. The size of the spacer 117 may be dynamically updated to comply with a size of the non-rendered page of items 108 when the non-rendered page of items is rendered in the visible area 114. As a result, a number of spacers may increase or decrease to match a number of pages of the large dataset.

The client application 102 may assign an initial focus position 118 to the initial page of items 106. Furthermore, the initial page of items 106 may be stored in a focus page index in an association with the initial focus position 118. For example, upon rendering the non-rendered page of items 108 in the visible area 114, an input focus on the initial page of items 106 may be preserved storing the initial page of items 106 in a focus page index in an association with the initial focus position 118. Focus on the initial page of items 106 may be restored by re-rendering the initial page of items 106 in the visible area 114 upon a retrieval from the focus page index. An example implementation of the focus page index may include a cache or a buffer associated with the large dataset.

In an example scenario, upon detecting an input action (such as a tab action), the initial page of items 106 may be re-rendered in the visible area. Next, a non-rendered page of items that corresponds to the input action may be retrieved and rendered in the visible area (for example, a page of items following the initial page of items (in the large dataset) may be rendered in the visible area). The non-rendered page of items selected for rendering (in response to the input action) may be retrieved from the large dataset based on a direction associated with the input action (for example, a previous page of items may be rendered in response to a shift tab action). Content in the focus page index (such as the initial page of items 106) may be accessed and/or searched by referring to the content with an associated focus position (such as the initial focus position 118).

The computing device 104 may communicate with other client device(s) or server(s) through a network. The network may provide wired or wireless communications between network nodes such as the computing device 104, other client device(s) and/or server(s), among others. Previous example(s) to preserve an input focus in a large dataset in the client application 102 are not provided in a limiting sense. Alternatively, the large dataset may be hosted by an external provider and accessed by the client application 102, among others. Furthermore, a service hosted by a physical server may provide a client interface such as the client application 102 that preserves an input focus in a virtualized dataset at the computing device 104.

The consumer 110 may interact with the client application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the client application 102, embodiments are not limited to these components or system configurations and can be implemented with other system configuration employing fewer or additional components.

Figure 2:
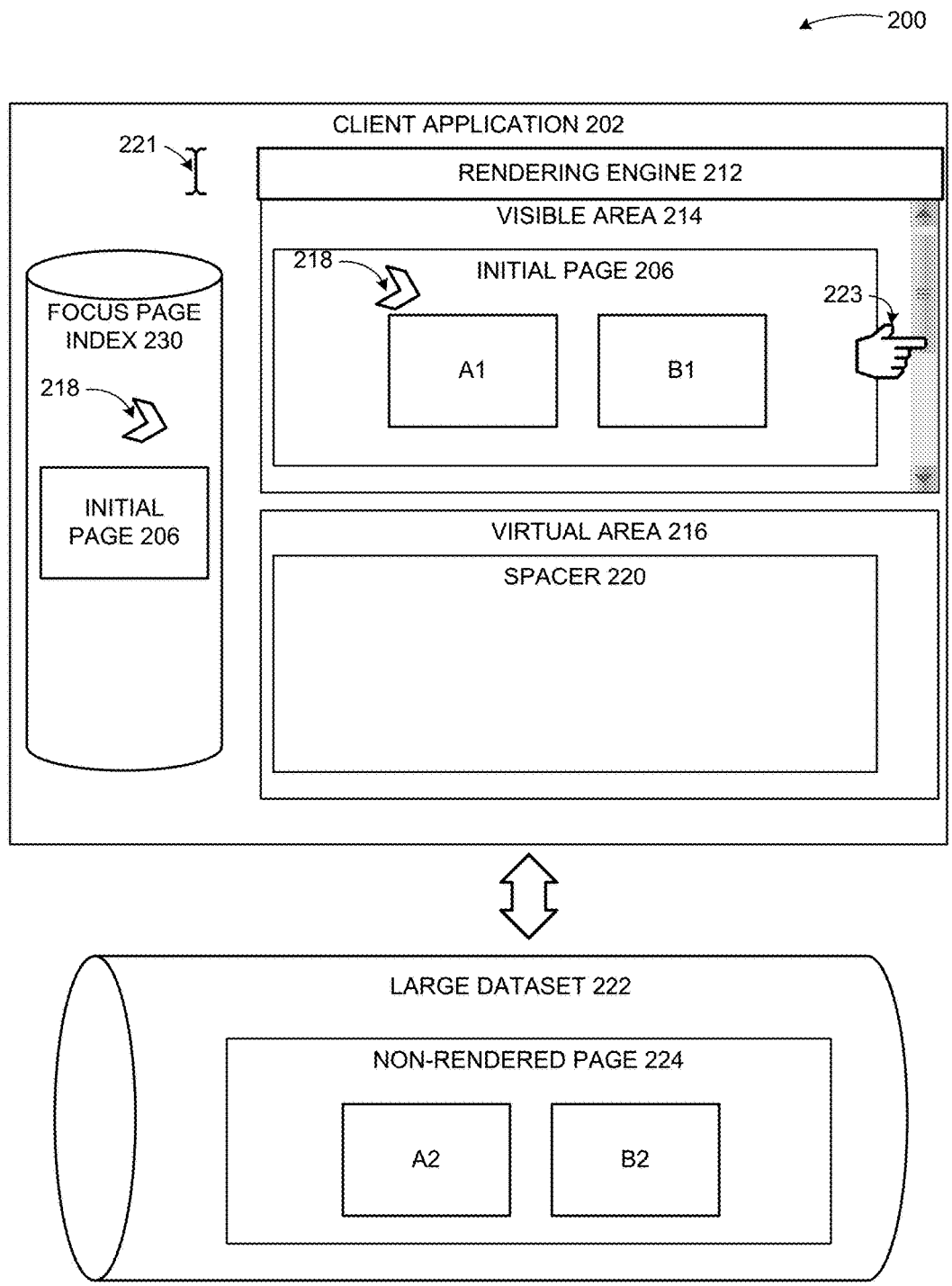
FIG. 2 is a display diagram illustrating example components of a client application that preserves an input focus in a virtualized dataset, according to embodiments.

FIG. 2 is a display diagram illustrating example components of a client application that preserves an input focus in a virtualized dataset, according to embodiments.

In a diagram 200, a rendering engine 212 of a client application 202 may render an initial page of items 206 in a visible area 214. The initial page of items 206 may include items A1 and B1. The initial page of items 206 may also include a page of items from a beginning position of the large dataset 222. Alternatively, the initial page of items 206 may include a previously rendered page of items from the large dataset 222. The visible area 214 may include a user interface of the client application 202. The client application 202 may also render a spacer 220 in a virtual area 216 as a placeholder for a non-rendered page of items from the large dataset 222.

A size of the spacer 220 may be configured to accommodate a size of the initial page of items 206. The size of the initial page items 206 is used to configure the spacer (and others) as non-rendered pages of items may be partitioned based on a number of items in the initial page of items 206. As such, the number of spacers rendered in the virtual area 216 match the number of non-rendered pages of items in the large dataset 222. Alternatively, a size of the non-rendered page(s) of items may be increased (for example, 2×, 3×, and/or 4× among others) and/or decreased (for example, 0.5× among others). A size of the spacer(s) corresponding to the non-rendered page(s) of items may proportionally increase and/or decrease. If the size of the non-rendered page(s) of items increase, a scroll action may proceed faster compared to non-rendered page(s) of items with a normal size. As such, an increased size of the non-rendered page(s) of items may allow a consumer 110 to scroll through the large dataset faster and allow faster operations to reach a desired page of items. Alternatively, a decreased size of the non-rendered page(s) of items may allow a consumer 110 to scroll through the large dataset slower and allow finer granularity through a scroll action.

In an example scenario, the spacer 220 may serve as a placeholder for a non-rendered page of items 224 in the large dataset 222. The spacer 220 may allow the rendering engine 212 to save resources and improve response when rendering the large dataset 222. For example, a scroll action 223 may be detected to conclude at the spacer 220. In response, the rendering engine 212 may access the large dataset 222 to retrieve the non-rendered page of items 224 that is associated with the spacer 220. The rendering engine may replace the spacer 220 with the non-rendered page of items 224. The initial page of items 206 may be removed from the visible area 214. Furthermore, the non-rendered page of items 224 may be rendered as a following page of items in the visible area 214.

The rendering engine 212 may retrieve the non-rendered page of items 224 by counting a number of skipped spacers between the initial page of items 206 and the spacer 220 associated with the non-rendered page of items 224. The non-rendered page of items 224 may be located in the large dataset 222 in a location that is a number of skipped non-rendered pages of items away from the initial page of items 206. The number of skipped non-rendered pages of items may match the number of skipped spacers. Furthermore, the number of skipped non-rendered pages of items may be counted in a direction of the scroll action 223.

The rendering engine 212 may fail to detect other action(s) that remove the input focus from the initial page of items 206 while the rendering engine 212 presents the non-rendered page of items 224. As such, the input focus on the initial page of items 206 may be preserved with the initial focus position 218. To preserve the input focus, the rendering engine 212 may store the initial page of items 206 in an association with the initial focus position 218 in a focus page index 230. In a scenario where the rendering engine 212 displays the non-rendered page of items 224 in the visible area 214, the input focus may be returned to the initial page of items 206 in response to detecting an editing action 221 (such as a typing input, a gesture based input, and/or a voice based input to enter and/or edit content). Upon detecting the editing action 221, the focus page index 230 may be queried with the initial focus position 218 to locate and retrieve the initial page of items 206. The initial page of items 206 may be re-rendered on the visible area 214 while removing the non-rendered page of items 224 rendered as the following page of items from the visible area 214.

Figure 3:
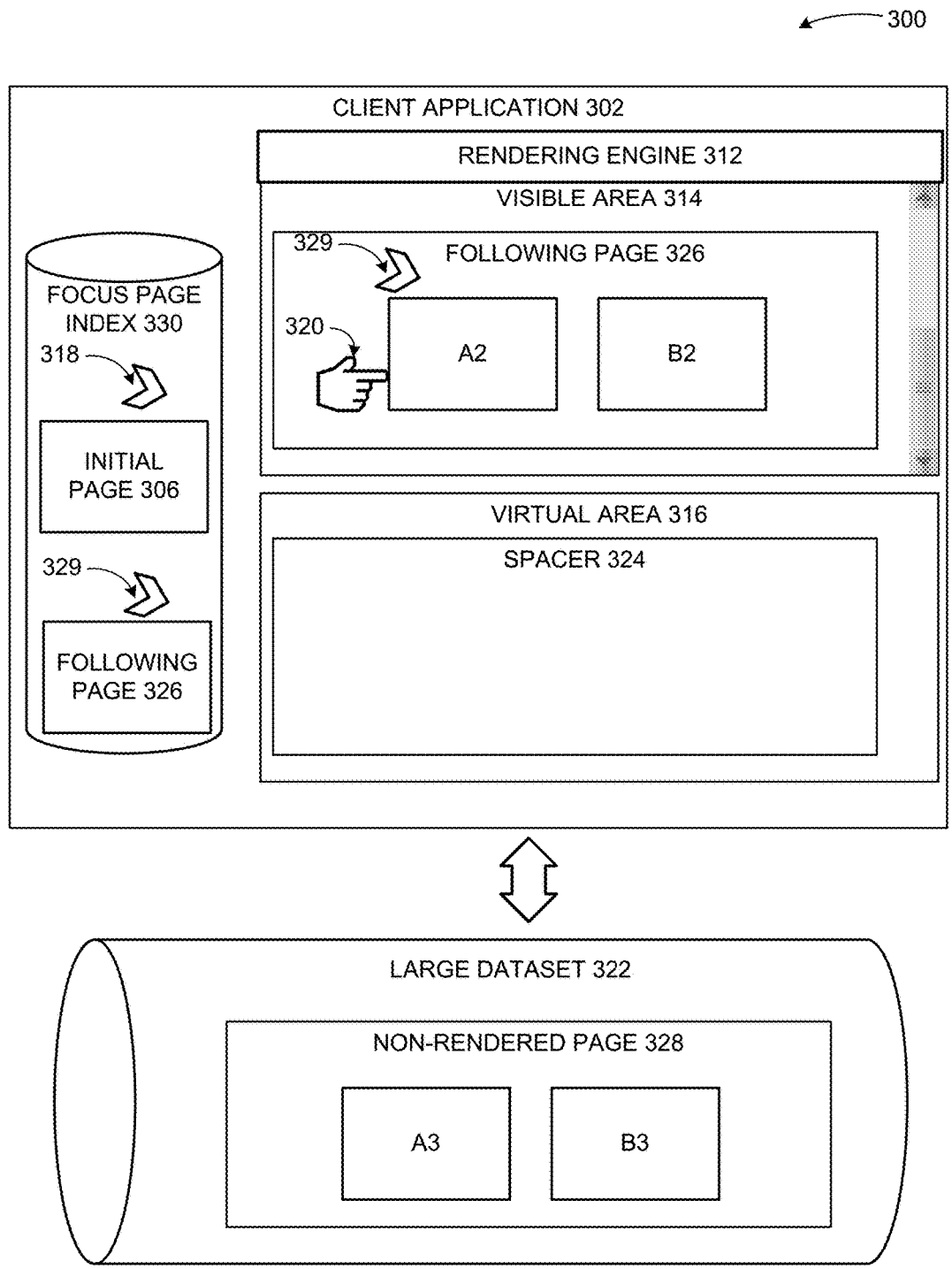
FIG. 3 is a display diagram illustrating components of a scheme to preserve an input focus in a virtualized dataset, according to embodiments.

FIG. 3 is a display diagram illustrating components of a scheme to preserve an input focus in a virtualized dataset, according to embodiments.

In a diagram 300, a rendering engine 312 of the client application 302 may render a following page of items 326 in a visible area 314. The following page of items 326 may be retrieved from a large dataset 322 in response to detecting a scroll action to replace an initial page of items 306 previously rendered in the visible area 314. An input focus on the initial page of items 306 may be preserved by assigning an initial focus position 318 to the initial page of items 306 and storing the initial page of items 306 in a focus page index 330. As such, in response to an action to shift the input focus back to the initial page of items 306, the rendering engine 312 may retrieve the initial page of items 306 by using the initial focus position 318, removing the following page of items 326 from the visible area 314 and re-render the initial page of items 306 in the visible area 314.

The rendering engine 312 may also shift the input focus (or generate a new input focus) on the following page of items 326 in response to detecting an input action 320 on the visible area 314 while displaying the following page of items 326. The input action 320 may include a selection of an item A2 or B2. The input focus may be shifted from the initial page of items 306 to the following page of items 326 by assigning a new focus position 329 to the following page of items 326. Alternatively, the new focus position 329 may be assigned to generate the new focus on the following page of items 326 (in addition to an input focus on the initial page of items 306 represented by the initial focus position 318).

The following page of items 326 may be stored in the focus page index 330 in an association with the new focus position 329. The following page of items 326 may be stored in the focus page index 330 in addition to the initial page of items 306. In such a scenario, a consumer requesting to restore a previously focused page of items may be presented with a choice between the initial page of items 306 or the following page of items 326. Alternatively, the rendering engine 312 may discard the initial page of items 306 and the initial focus position 318 in response to insertion of the following page of items 326 in to the focus page index 330.

The rendering engine 312 may also render a spacer 324 in a virtual area 316 that corresponds to a non-rendered page of items 328 from the large dataset 322. A size of the spacer 324 may be configured to accommodate a size of the following page of items 326. The rendering engine 312 may retrieve the non-rendered pages of items 328 upon a conclusion of a scroll action at the spacer 324. The spacer 324 may be discarded and the non-rendered page of items 328 may be rendered in the visible area 314 as a subsequent page of items.

Figure 4:
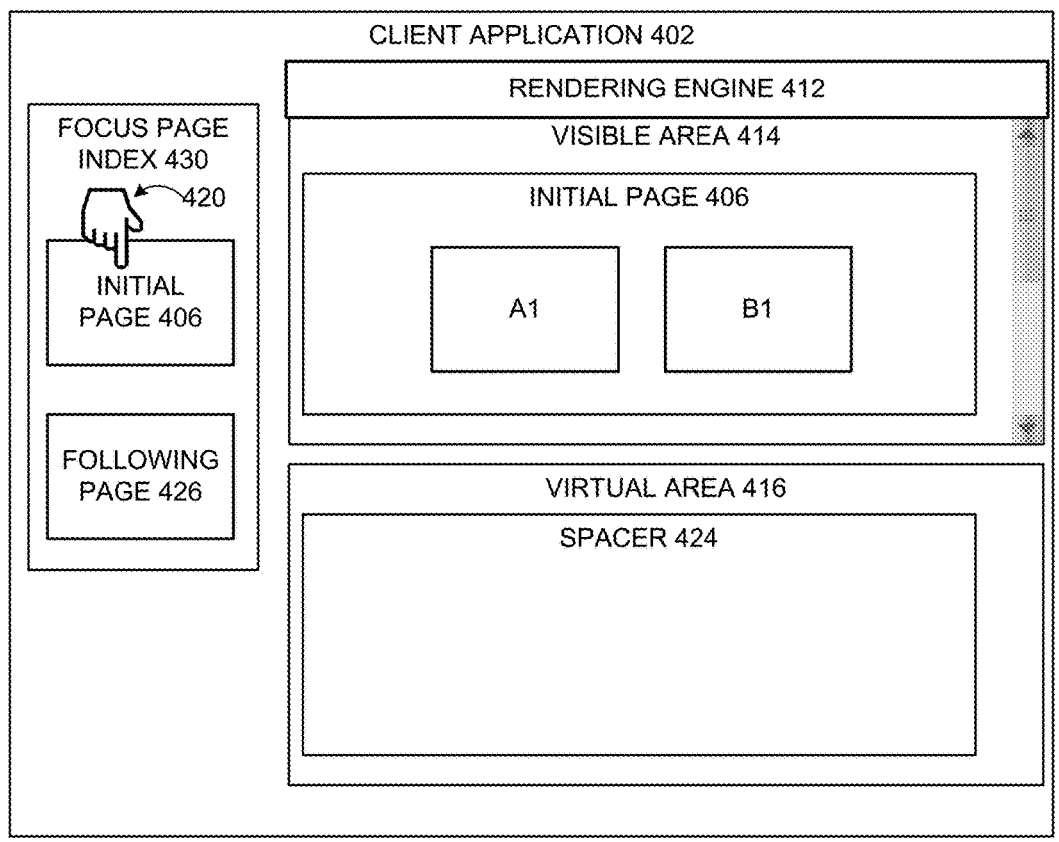
FIG. 4 is a display diagram illustrating a scheme to restore focus to a preserved page of items from a virtualized dataset, according to embodiments.

FIG. 4 is a display diagram illustrating a scheme to restore focus to a preserved page of items from a virtualized dataset, according to embodiments.

In a diagram 400, a rendering engine 412 of a client application 402 may present a focus page index 430 in response to a request to access the focus page index 430. The rendering engine 412 may present the focus page index 430 to allow a consumer to restore foci preserved on page(s) of items such as an initial page of items 406 and a following page of items 426.

In an example scenario, the rendering engine 412 may display a following page of items 426 in the visible area 414. The rendering engine 412 may receive an input 420 that selects the initial page of items 406 in the focus page index 430. Next, the initial page of items 406 may be retrieved from the focus page index 430. Furthermore, the following page of items 426 may be removed from the visible area 414. The initial page of items 406 may be presented in the visible area 414 in place of the following page of items 426. A spacer 424 associated with the following page of items 426 may be rendered in a virtual area 416 of the client application 402.

As discussed above, the client application may be employed to preserve an input focus in a virtualized dataset. An increased user efficiency with the client application 102 may occur as a result of processing items to preserve an input focus of a previously rendered page. Additionally, re-rendering the previously rendered page to restore an input focus upon a detected action requesting the restoration, by the client application 102, may prevent focus disorientation by the consumer 110 and therefore reduce and/or eliminate resource consumption by the consumer 110 while attempting to manually restore an input focus. As such, automatically restoring input focus may reduce processor load, increase processing speed, conserve memory, and reduce network bandwidth usage.

Embodiments, as described herein, address a need that arises from a lack of efficiency to preserve an input focus in a virtualized dataset. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Preserving an input focus in a virtualized dataset may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
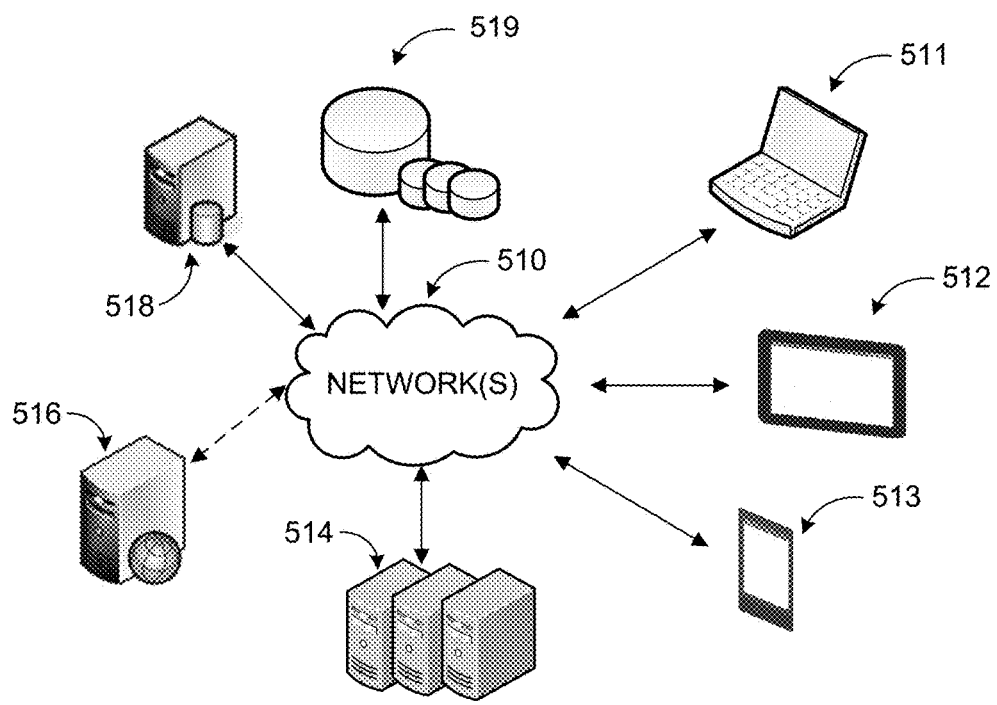
FIG. 5 is a simplified networked environment, where a system according to embodiments may be implemented.

FIG. 5 is an example networked environment, where embodiments may be implemented. A client application configured to preserve an input focus in a virtualized dataset may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A client application may present an initial page of items from a large dataset in a visible area. A spacer may be rendered in a virtual area. The spacer may be associated with a non-rendered page of items from the large dataset. An initial focus position may be assigned to the initial page of items. The initial page of items may be stored in a focus page index in an association with the initial focus position. The client application may store data associated with page(s) of items in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to preserve a focus in a virtualized dataset. Furthermore, the networked environments discussed in FIG. 5 are for illustration purposes only. Embodiments are not limited to the example applications, modules, or processes.

Figure 6:
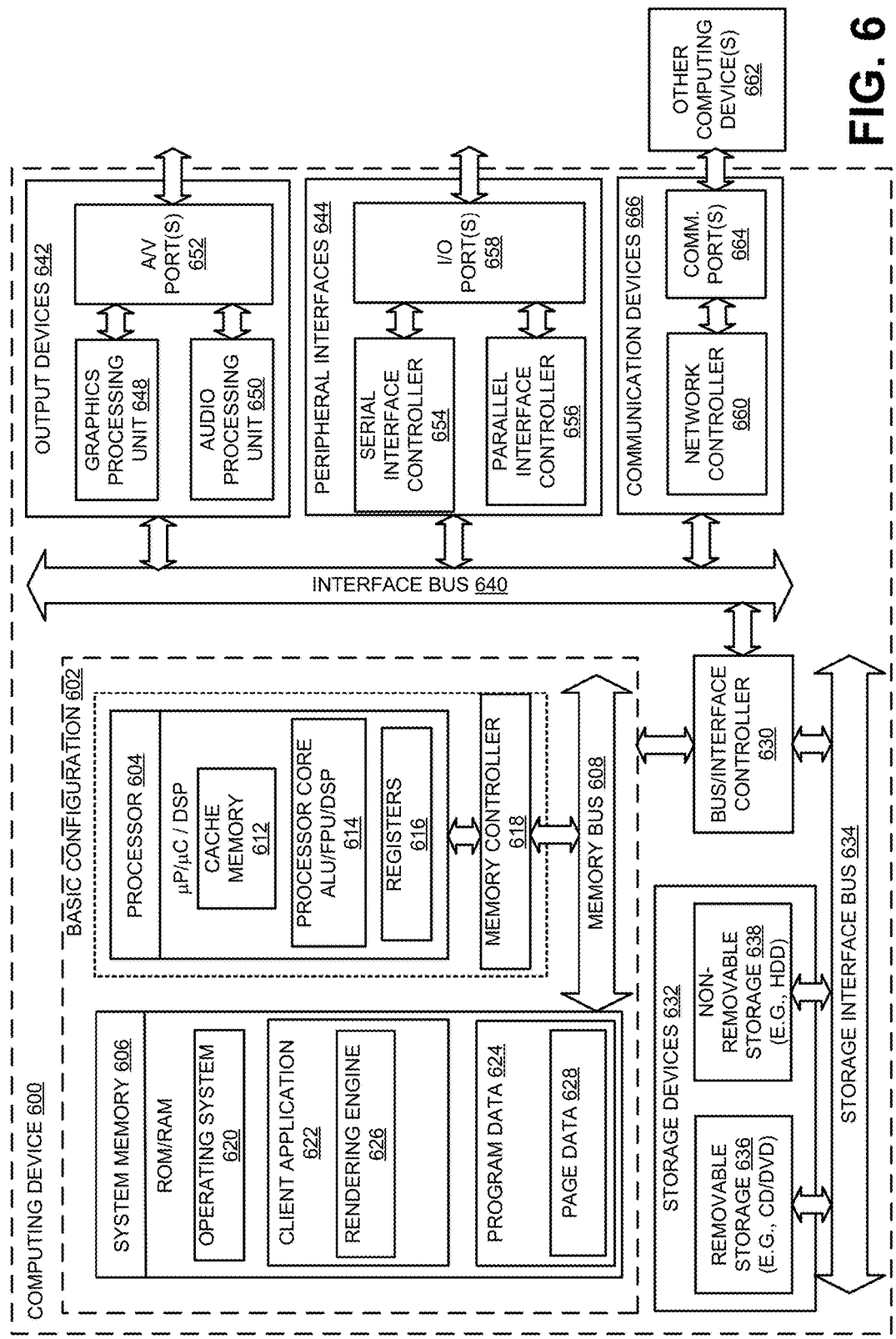
FIG. 6 is a block diagram of an example computing device, which may be used to preserve focus in a virtualized dataset, according to embodiments.

FIG. 6 is a block diagram of an example computing device, which may be used to preserve an input focus in a virtualized dataset, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a client application 622, and a program data 624. The client application 622 may include components such as a rendering engine 626. The rendering engine 626 may execute the processes associated with the client application 622. The rendering engine 626 may present an initial page of items from a large dataset in a visible area. A spacer may be rendered in a virtual area. The spacer may be associated with a non-rendered page of items from the large dataset. An initial focus position may be assigned to the initial page of items. The initial page of items may be stored in a focus page index in an association with the initial focus position.

The client application 622 may display the large dataset as page(s) of items through a display component associated with the computing device 600. An example of the display component may include a monitor, and/or a touch screen, among others that may be communicatively coupled to the computing device 600. The program data 624 may also include, among other data, page data 628, or the like, as described herein. The page data 628 may include items from the large dataset.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports

664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to preserve an input focus in a virtualized dataset. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
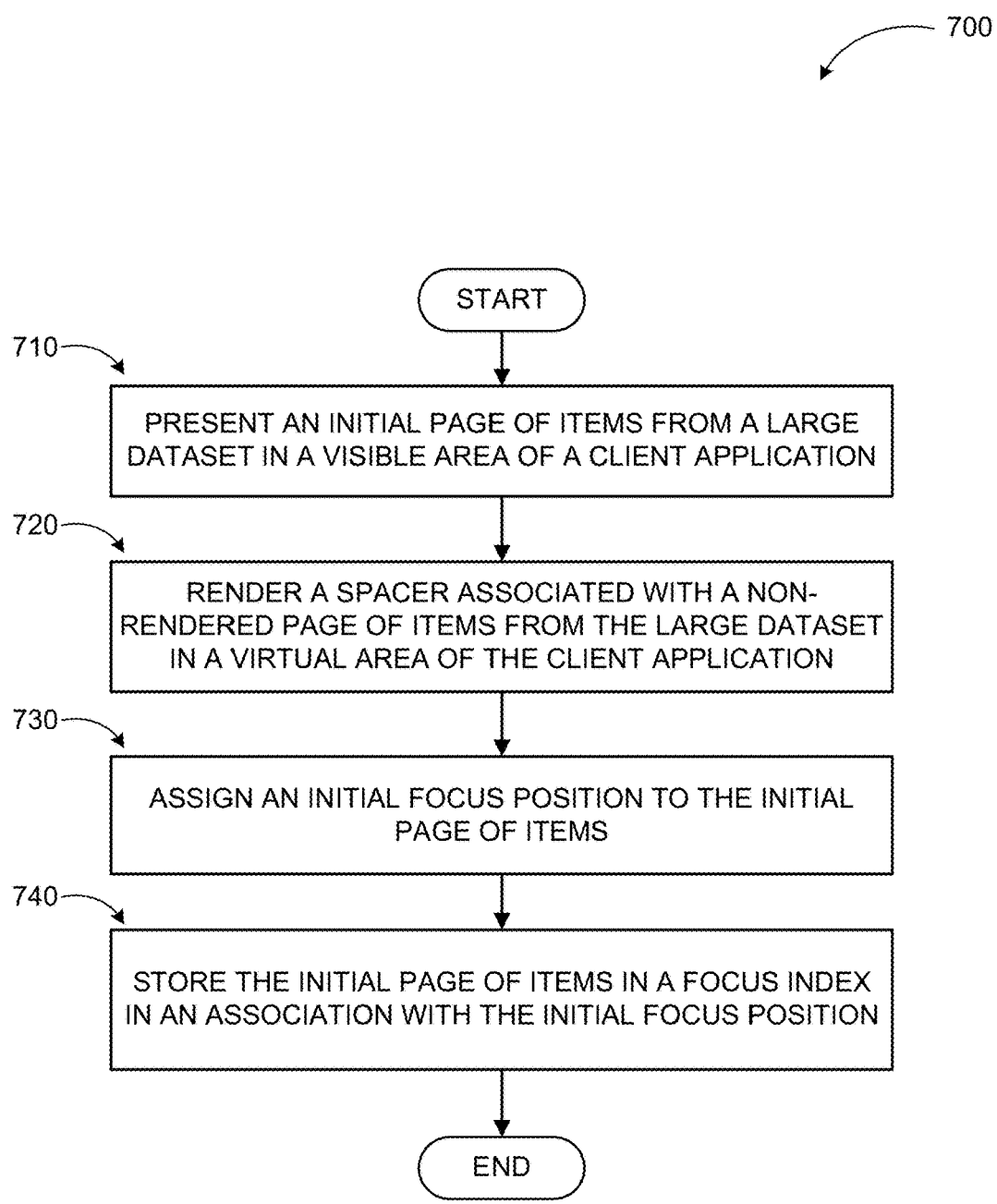
FIG. 7 is a logic flow diagram illustrating a process for preserving an input focus in a virtualized dataset, according to embodiments.

FIG. 7 is a logic flow diagram illustrating a process for preserving an input focus in a virtualized dataset, according to embodiments. Process 700 may be implemented on a computing device, such as the computing device 600 or another system.

Process 700 begins with operation 710, where the client application presents an initial page of items from a large dataset in a visible area. The initial page of items may be partitioned from the large dataset to fit a size of the visible area for an optimum or desired readability of the items. Next, at operation 720, the client application may render a spacer associated with a non-rendered page of items from the large dataset in a virtual area. A size of the spacer may be configured to accommodate a size of the initial page of items.

At operation 730, the client application may assign an initial focus position to the initial page of items. The initial focus position may be used as referral tool to preserve an input focus on the initial page of items. At operation 740, the initial page of items may be stored in a focus page index in an association with the initial focus position. The focus page index may be accessed to restore the initial page of items to the visible area upon a detected action to restore the input focus on the initial page of items.

The operations included in process 700 is for illustration purposes. Preserving an input focus in a virtualized dataset may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device to preserve an input focus in a virtualized dataset is described. The computing device includes a display component, a memory configured to store instructions associated with a client application, and a processor coupled to the memory and the display component. The processor executes the client application in conjunction with the instructions stored in the memory. The client application includes a rendering engine. The rendering engine is configured to present, on the display component, an initial page of items from a large dataset in a visible area of the client application, render a spacer associated with a non-rendered page of items from the large dataset in a virtual area of the client application. assign an initial focus position to the initial page of items, and store the initial page of items in a focus page index in an association with the initial focus position.

In other examples, a size of the spacer is configured to accommodate a size of the initial page of items. The rendering engine is further configured to detect a scroll action, retrieve the non-rendered page of items associated with the scroll action from the large dataset, and render, on the display component, the non-rendered page of items in the visible area as a following page of items. Retrieving the non-rendered page of items associated with the scroll action from the large dataset includes one or more operations to count a number of skipped spacers between the initial page of items and the spacer associated with the non-rendered page of items and locate the non-rendered page of items in the large dataset in a location that is a number of skipped non-rendered pages of items away from the initial page of items, where the number of skipped non-rendered pages of items match the number of skipped spacers. Retrieving the non-rendered page of items associated with the scroll action further includes one or more operations to count the number of skipped non-rendered pages of items in a direction of the scroll action.

In further examples, the rendering engine is further configured to remove the initial page of items from the visible area. The rendering engine is further configured to detect a directional key entry from a keyboard action, query the focus page index with the initial focus position to locate the initial page of items, retrieve the initial page of items from the focus page index, and render, on the display component, the initial page of items in the visible area. An example of the directional key entry may include a tab input, an arrow input, among others. The rendering engine is further configured to remove the following page of items from the visible area.

In other examples, the rendering engine is further configured to detect an input action on the visible area, assign a new focus position to the following page of items, and store the following page of items in the focus page index in an association with the new focus position. An example of the input action may include a mouse click, a character entry from a keyboard action, among others. The rendering engine is further configured to remove the initial page of items from the focus page index and delete the initial focus position. An instance of the focus page index includes one or more of a cache and a buffer associated with the large dataset.

In some examples, a method executed on a computing device to preserve an input focus in a virtualized dataset is described. The method includes presenting an initial page of items from a large dataset in a visible area of a client application, rendering a spacer associated with a non-rendered page of items from the large dataset in a virtual area of the client application, assigning an initial focus position to the initial page of items, storing the initial page of items in a focus page index in an association with the initial focus position, and retrieving the non-rendered page of items from the large dataset and rendering the non-rendered page of items in the visible area as a following page of items in response to detecting a scroll action.

In other examples, the method further includes assigning a new focus position to the following page of items and storing the following page of items in the focus page index in an association with the new focus position. The method further includes detecting a request to access the focus page index and presenting the focus page index. The method further includes receiving a selection of the initial page of items from the focus page index, retrieving the initial page of items from the focus page index, removing the following page of items from the visible area, and presenting the initial page of items in the visible area. The method further includes removing the initial page of items from the visible area and rendering other spacer associated with the initial page of items in the virtual area. A size of the other spacer is configured to accommodate a size of the following page of items.

In some examples, a computer-readable memory device with instructions stored thereon to preserve an input focus in a virtualized dataset is described. The instructions include actions similar to actions of the method.

In some examples, a means for preserving an input focus in a virtualized dataset is described. The means for preserving an input focus in a virtualized dataset includes a means for presenting an initial page of items from a large dataset in a visible area of the client application, a means for rendering a spacer associated with a non-rendered page of items from the large dataset in a virtual area of the client application, a means for assigning an initial focus position to the initial page of items, and a means for storing the initial page of items in a focus page index in an association with the initial focus position.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to preserve an input focus in a virtualized dataset, the computing device comprising:
   a display component;
   a memory configured to store instructions associated with a client application and a focus page index;
   a processor coupled to the memory and the display component, the processor executing the client application in conjunction with the instructions stored in the memory, wherein the client application includes instructions that direct the computing device to:
      present, on the display component, an initial page of items from a large dataset in a visible area of the client application;
      render a spacer associated with a non-rendered page of items from the large dataset in a virtual area of the client application;
      detect an initial input action on the visible area while the initial page of items is in the visible area;
      assign an initial focus position to the initial page of items based on the initial input action; and
      store the initial page of items in the focus page index, in the memory, in an association with the initial focus position, wherein the focus page index preserves the initial focus position;
      detect a scroll action while the initial page of items is in the visible area;
      in response to the scroll action, retrieve the non-rendered page of items associated with the scroll action from the large dataset; and render, on the display component, the non-rendered page of items in the visible area as a following page of items in place of the initial page of items;
      detect a directional key entry from a keyboard action while the following page of items is in the visible area; and
      in response to the directional key entry, query the focus page index with the initial focus position to locate the initial page of items; retrieve the initial page of items from the focus page index; and render, on the display component, the initial page of items in the visible area in place of the following page of items.

2. The computing device of claim 1, wherein a size of the spacer is configured to accommodate a size of the initial page of items.

3. The computing device of claim 1, wherein retrieving the non-rendered page of items associated with the scroll action from the large dataset includes one or more operations to:
   count a number of skipped spacers between the initial page of items and the spacer associated with the non-rendered page of items; and
   locate the non-rendered page of items in the large dataset in a location that is a number of skipped non-rendered pages of items away from the initial page of items, wherein the number of skipped non-rendered pages of items match the number of skipped spacers.

4. The computing device of claim 3, wherein retrieving the non-rendered page of items associated with the scroll action further includes one or more operations to:
   count the number of skipped non-rendered pages of items in a direction of the scroll action.

5. The computing device of claim 1, wherein the rendering engine is further configured to:
   detect an input action on the visible area while the following page of items is in the visible area; and
   in response to the input action, assign a new focus position to the following page of items based on the input action; and store the following page of items in the focus page index in an association with the new focus position.

6. The computing device of claim 5, wherein the rendering engine is further configured to:
   after the new focus position is assigned to the following page of items, remove the initial page of items from the focus page index; and delete the initial focus position.

7. The computing device of claim 1, wherein an instance of the focus page index includes one or more of a cache and a buffer associated with the large dataset.

8. A method executed on a computing device to preserve an input focus in a virtualized dataset, the method comprising:
- presenting an initial page of items from a large dataset in a visible area of a client application;
- rendering a spacer associated with a non-rendered page of items from the large dataset in a virtual area of the client application;
- detecting an initial input action on the visible area while the initial page of items is in the visible area;
- assigning an initial focus position to the initial page of items based on the initial input action;
- storing the initial page of items in a focus page index, in a memory, in an association with the initial focus position, wherein the focus page index preserves the initial focus position;
- in response to detecting a scroll action while the initial page of items is in the visible area, retrieving the non-rendered page of items from the large dataset, rendering the non-rendered page of items in the visible area as a following page of items in place of the initial page of items, and maintaining the initial focus position in the focus page index; and
- in response to detecting a direction key entry from a keyboard action while the following page of items is in the visible area, querying the focus page index with the initial focus position to locate the initial page of items; retrieving the initial page of items from the focus page index; and rendering the initial page of items in the visible area in place of the following page of items.

9. The method of claim 8, further comprising:
- in response to detecting an input action on the visible area while the following page of items is in the visible area, assigning a new focus position to the following page of items based on the input action; and storing the following page of items in the focus page index in an association with the new focus position.

10. The method of claim 9, further comprising:
- detecting a request to access the focus page index while the following page of items is in the visible area; and presenting the focus page index.

11. The method of claim 10, further comprising:
- receiving a selection of the initial page of items from the focus page index; and
- in response to receiving the selection of the initial page of items from the focus page index, retrieving the initial page of items from the focus page index; removing the following page of items from the visible area; and presenting the initial page of items in the visible area.

12. The method of claim 8, wherein in response to detecting the scroll action while the initial page of items is in the visible area, the method further comprising:
- removing the initial page of items from the visible area; and
- rendering another spacer associated with the initial page of items in the virtual area.

13. The method of claim 12, wherein a size of the other spacer is configured to accommodate a size of the following page of items.

14. A computer-readable memory device with instructions stored thereon to preserve an input focus in a virtualized dataset, the instructions, when executed, direct a computing device to:
- present an initial page of items from a large dataset in a visible area of a client application;
- render a spacer associated with a non-rendered page of items from the large dataset in a virtual area of the client application;
- detect an initial input action on the visible area while the initial page of items is in the visible area;
- assign an initial focus position to the initial page of items based on the initial input action;
- store the initial page of items in a focus page index, in a memory, in an association with the initial focus position, wherein the focus page index preserves the initial focus position;
- detect a scroll action while the initial page of items is in the visible area;
- in response to the scroll action, retrieve the non-rendered page of items from the large dataset, and render the non-rendered page of items in the visible area as a following page of items in place of the initial page of items
- detect a directional key entry from a keyboard action while the following page of items is in the visible area; and
- in response to the directional key entry, query the focus page index with the initial focus position to locate the initial page of items; retrieve the initial page of items from the focus page index; and render the initial page of items in the visible area in place of the following page of items.

15. The computer-readable memory device of claim 14, wherein the instructions to retrieve the non-rendered page of items in response to the scroll action direct the computing device to:
- count a number of skipped spacers between the initial page of items and the spacer associated with the non-rendered page of items;
- locate the non-rendered page of items in the large dataset in a location that is a number of skipped non-rendered pages of items away from the initial page of items, wherein the number of skipped non-rendered pages of items match the number of skipped spacers; and
- count the number of skipped non-rendered pages of items in a direction of the scroll action.

16. The computer-readable memory device of claim 14, further comprising instructions that when executed direct the computing device to:
- remove the initial page of items from the visible area; and
- render another spacer associated with the initial page of items in the virtual area, wherein a size of the other spacer is configured to accommodate a size of the following page of items.

* * * * *